United States Patent
Lu

(10) Patent No.: US 8,532,339 B2
(45) Date of Patent: *Sep. 10, 2013

(54) SYSTEM AND METHOD FOR MOTION DETECTION AND THE USE THEREOF IN VIDEO CODING

(75) Inventor: Jiangbo Lu, Leuven (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,546

(22) Filed: Aug. 8, 2011

(65) Prior Publication Data

US 2012/0063646 A1 Mar. 15, 2012

Related U.S. Application Data

(63) Continuation of application No. 12/039,639, filed on Feb. 28, 2008, now Pat. No. 7,995,800.

(60) Provisional application No. 60/903,909, filed on Feb. 28, 2007.

(51) Int. Cl.
*G06K 9/00* (2006.01)

(52) U.S. Cl.
USPC .......................................................... 382/107

(58) Field of Classification Search
USPC .................. 382/107, 166, 232, 244
See application file for complete search history.

(56) References Cited

U.S. PATENT DOCUMENTS

| | | | |
|---|---|---|---|
| 5,557,684 A * | 9/1996 | Wang et al. .................. | 382/107 |
| 5,629,988 A * | 5/1997 | Burt et al. .................... | 382/276 |
| 5,703,965 A * | 12/1997 | Fu et al. ....................... | 382/232 |
| 5,963,675 A * | 10/1999 | van der Wal et al. ......... | 382/260 |
| 6,690,835 B1 | 2/2004 | Brockmeyer et al. | |
| 7,623,683 B2 * | 11/2009 | Chen et al. .................... | 382/107 |
| 2004/0184541 A1 | 9/2004 | Brockmeyer et al. | |
| 2006/0257048 A1* | 11/2006 | Lin et al. ...................... | 382/276 |

OTHER PUBLICATIONS

Bevilacqua, A. et al., "A novel approach to change detection based on a coarse-to-fine strategy," in *IEEE ICIP*, 2:434-437, Proceedings of the 2005 International Conference on Image Processing, Italy, Sep. 11-14, 2005.

(Continued)

*Primary Examiner* — Tom Y Lu
(74) *Attorney, Agent, or Firm* — Knobbe Martens Olson & Bear LLP

(57) ABSTRACT

A system and method for motion detection and the use thereof in video coding are disclosed. In one aspect, a method of defining a region of motion within a video frame in a sequence of video frames comprises loading a current video frame and at least one reference video frame from the sequence, the reference video frame being different from the current video frame. The method further comprises applying filtering operations on the current and the reference video frame in order to obtain at least two scales of representation of the current and the reference video frame. The method further comprises determining for each of the scale representations a video-frame like representation of the structural changes between the current and the reference video frame. The method further comprises combining the video-frame like representations of different scales. The method further comprises determining one or more regions of motion from the combination.

22 Claims, 6 Drawing Sheets

(56) References Cited

OTHER PUBLICATIONS

Bradski, G. and Davies, J., "Motion segmentation and pose recognition with motion history gradients," in *IEEE WACV*, pp. 238-244, Fifth IEEE Workshop on Applications of Computer Vision, California, USA, Dec. 2000.

Cavallaro, A. et al., "Semantic video analysis for adaptive content delivery and automatic description," *IEEE Tran. on CSVT*, vol. 15, No. 10, Oct. 2005.

Li, J. et al., "Bi-level video: video communication at very low bit rates," in *ACM Multimedia*, 9:392-400, MM'01 in Ottowa, Canada, Sep. 30-Oct. 5, 2001.

Lius, F. and Gleicher, M., "Region enhanced scale-invariant saliency detection," in *IEEE ICME*, pp. 1477-1480, International Conference on Multimedia & Expo, Ontario, Canada, Jul. 9-12, 2006.

Radke, R.J. et al., "Image change detection algorithms: a systematic survey," *IEEE Tran. on Image Processing*, vol. 14 No. 3, pp. 294-307, Mar. 2005.

Wu, K. et al., "Optimizing connected component labeling algorithms," in *Proc. SPIE Medical Imaging Conference*, 5747:1965-1976, California, USA, Feb. 17, 2005.

\* cited by examiner

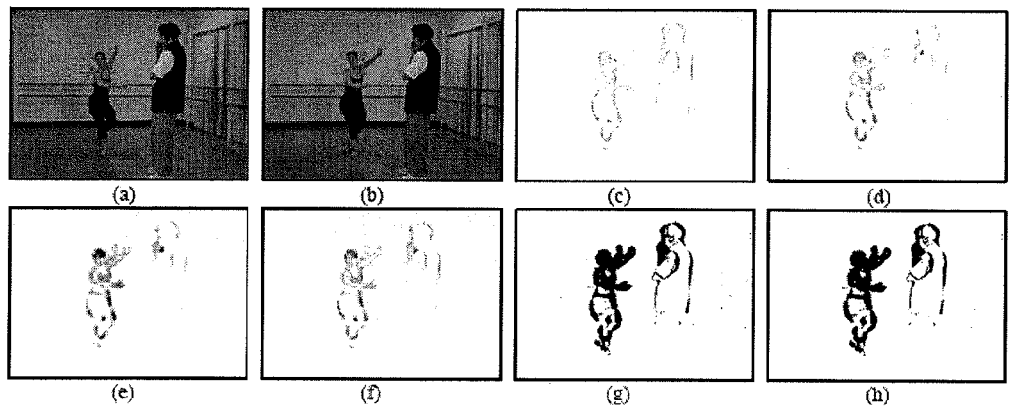

Fig. 1. The flowchart of the pixel level processing. (a) Previous luma frame $I_{t-1}$ (b) Current luma frame $I_t$ (c-e) SAD of Laplacian difference $D_t$ at the image scale 0, 1, and 2, respectively (f) $S_t$: aggregating multi-scale $D_t$ and normalizing the result $S_t$ to [0, 255] (g) Thresholding $\tilde{S}_t$ (h) Applying the median filter and morphological *closing* (dilation-erosion) operation. For ease of printing, the difference images are negated.

| | QP | Average FG-PSNR for P frames (dB) | | | Average bitrate for P frames (kbps) | | |
|---|---|---|---|---|---|---|---|
| | | Ori. PSNR | Pro. PSNR | δ-PSNR | Ori. bitrate | Pro. bitrate | δ-bitrate |
| Akiyo | 28 | 37.02 | 36.99 | -0.03 | 75.39 | 63.56 | 15.69% |
| | 32 | 34.09 | 34.10 | 0.01 | 40.01 | 34.06 | 14.88% |
| | 36 | 31.41 | 31.46 | 0.05 | 23.12 | 19.36 | 16.28% |
| Hall | 28 | 35.94 | 35.91 | -0.03 | 237.89 | 156.85 | 34.06% |
| | 32 | 32.96 | 32.94 | -0.02 | 105.58 | 83.58 | 20.84% |
| | 36 | 30.06 | 30.05 | -0.01 | 54.70 | 47.00 | 14.09% |
| Ballet | 28 | 40.78 | 40.72 | -0.06 | 491.79 | 394.82 | 19.72% |
| | 32 | 39.22 | 39.16 | -0.07 | 312.39 | 260.52 | 16.60% |
| | 36 | 37.40 | 37.30 | -0.10 | 204.24 | 177.90 | 12.90% |

Fig 9: R-D coding performance comparison between the original (Ori.) H.264 encoder and the proposed (Pro.) video encoder

SYSTEM AND METHOD FOR MOTION DETECTION AND THE USE THEREOF IN VIDEO CODING

CROSS REFERENCE TO RELATED APPLICATIONS

This application is a continuation of co-pending U.S. patent application Ser. No. 12/039,639 filed on Feb. 28, 2008, which claims priority under 35 U.S.C. §119(e) to U.S. provisional patent application No. 60/903,909 filed on Feb. 28, 2007. Each of the above applications is incorporated herein by reference in its entirety.

BACKGROUND OF THE INVENTION

1. Field of the Invention

The invention relates to a system and method for motion detection and the use thereof in video coding. The invention further relates to an apparatus implementing such methods for motion detection with or without combination with video coding.

2. Description of the Related Technology

Motion region detection is one of important early vision tasks for many high-level semantic video processing applications, e.g., automated video surveillance.

Motion region detection is an important vision topic usually tackled by a background subtraction principle, which has some practical restrictions. Traditional background subtraction paradigm [R. J. Radke, S. Andra, O. Al-Kofahi, and B. Roysam, "Image change detection algorithms: a systematic survey," *IEEE Tran. on Image Processing*, vol. 14, pp. 294-307, March 2005.] is based on segmenting motion regions based on the trained background models and hence knowledge of the fixed background is required.

By far, many algorithms have been proposed for motion detection and image saliency detection. However, striking a good tradeoff between the detection quality and computational load still remains a challenge. An efficient static region detection scheme (single-scaled approach) is adopted for bi-level video in [J. Li et al., "Bi-level video: video communication at very low bit rates," in *ACM Multimedia*, 2001, vol. 9, pp. 392-400.] and can be used in a context with rather simple scenes as in a video conference setting but it can not deal with complicated scenes well or distinguish separate moving objects.

To construct a scale-invariant saliency map from a static image, a hybrid multi-scale approach is proposed in [F. Lius and M. Gleicher, "Region enhanced scale-invariant saliency detection," in *IEEE ICME*, 2006, pp. 1477-1480.], and yet it involves a complicated image segmentation stage as well, e.g. based on edge detection within one image. No motion region detection is performed.

The coarse-to-fine strategy in [A. Bevilacqua, L. D. Stefano, A. Lanza, and G. Capelli, "A novel approach to change detection based on a coarse-to-fine strategy," in *IEEE ICIP*, 2005, vol. 2, pp. 434-437.] performs a coarse-level detection at a more than 10-times reduced image scale to achieve the computational efficiency, but the detection quality is hence compromised. This application is for image segmentation only, not for motion region detection. Moreover the coarse-to-final strategy, which implicitly uses a sort of multi-scale approach, exploits such scale aspect only for computational efficiency. Moreover, an integrated algorithm fully exploiting the cross-scale interrelation is not presented.

SUMMARY OF CERTAIN INVENTIVE ASPECTS

Certain inventive aspects relate to a method for motion detection, in particular motion region detection, based on multi-scale analysis of at least two video frames of a sequence of video frames, for instance two successive video frames, hence the motion detection is not performed with respect to a fixed background frame. More-over the multi-scale images of each of the video frames is used explicitly by combining (fusing) the information of the video frames as decomposed in their multi-scale components.

Certain inventive aspects relate to a method for defining a region of motion within a video frame, within a sequence of video frames, the method comprising: loading the current video frame, loading at least one other reference video frame of the sequence, applying filtering operations on the current and the reference video frame in order to obtain a multi-scale (at least two scales) representation of the current and the reference video frame, for each of the scale representations determining a video-frame like representation of the structural changes between the current and the reference video frame (e.g. by subtracting), and finally combining the video-frame like representations of the different scales and determining the region of motion from the combination.

Note that the reference video frame can be a previous video frame. However in accordance with some video coding standards, also other reference video frames may be identified, even video frames later in the sequence. Further note that the multi-scale representation may include the original image.

Since the reference video frame is part of the sequence of video frames, it is not a fixed background reference and hence after the step of determining the region of motion, when the method is repeated in a continuous fashion another video frame is used as reference for determining motion in another current video frame.

The method has the capability to indicate a plurality of separable motion regions (e.g. motion region boxes) in a video frame.

Moreover the method has the capability to work on color in the video frames.

In an embodiment at least one of the video frames (current, reference) or both are pre-filtered, for instance by using a median filter, to reduce noise.

In an embodiment the multi-scale representation is obtained by applying down-sampling operations, e.g. a Gaussian down-sampling filter.

In an embodiment the multi-scale representation is further filtered to suppress first order illumination changes, e.g. by applying a Laplacian filter.

In an embodiment the video-frame like representation of structural changes is then obtained by performing a difference operation.

In an embodiment the combining of the video-frame like representation is obtained by performing a summing operation.

In an aspect of the invention the method is used in combination with a video processing, in particular video coding based on motion estimation/motion compensation, whereby the motion estimation/motion compensation is used only on these regions where motion is detected with the motion detection method.

Since the proposed method detects motion regions simply from two successive video frames, it has the advantage such as avoiding the need for an initial background training period, and still suffice to provide salient motion regions for several applications, e.g., semantic video coding.

Aiming at an integrated fast and reliable solution the proposed hybrid motion region detection technique uses multi-scale structural change aggregation to accentuate the signals, while suppressing noise at different levels of processing.

A few specific algorithm changes are proposed to reduce the complexity. Finally, a promising motion-ROI based video coding scheme is proposed, resulting in much improved performance. Its key idea is to encode the motion foreground regions only, while repeating the background scene.

In an embodiment of the invention the use of histogram analysis for motion pixel distribution analysis is proposed.

In an embodiment of the invention the use of MB-alignment of the motion regions, in order to match with MB-oriented video processing, for instance as presented in US 2004 0184541, U.S. Pat. No. 6,690,835, is proposed.

BRIEF DESCRIPTION OF THE DRAWINGS

FIGS. 1(a)-1(h) are a flowchart of the pixel level processing. FIG. 1(a) shows previous luma frame $I_{t-1}$. FIG. 1(b) shows current luma frame $I_t$. FIGS. 1(c)-1(e) show SAD of Laplacian difference $D_t$ at the image scale 0, 1, and 2, respectively. FIG. 1(f) shows $bS_t$: aggregating multi-scale $D_t$ and normalizing the result St to [0, 255]. FIG. 1(g) shows Thresholding bSt. FIG. 1(h) shows applying the median filter and morphological closing (dilation-erosion) operation. For ease of printing, the difference images are negated.

FIG. 2(a) shows fast connected component analysis. FIG. 2(b) shows culling small-size noisy regions to yield a binary map. FIG. 2(c) shows distribution histogram of motion pixels along the horizontal axis. FIG. 2(d) shows clustering blobs by bounding-boxes (aligned and extended by 1 MB size). FIG. 2(e) shows superimposing the bounding-boxes on the input frame. The overall execution speed of motion-ROI based video coding (including the detection overhead) is about three times faster than that of conventional frame-based video encoders, though motion region detection is needed as a preprocessing step. This indicates that the proposed multi-scale algorithm is very computationally efficient.

FIG. 3(a) shows encoding only the MBs belonging to the detected motion bounding-boxes. FIG. 3(b) shows the reconstructed frame by stitching motion regions with static background.

FIG. 4(a) shows current frame. FIG. 4(b) shows Gaussian hypothesis test. FIG. 4(c) shows the single-scale variant of the proposed algorithm. FIG. 4(d) shows the proposed multi-scale algorithm.

FIG. 5(a) shows current frame. FIG. 5(b) shows Gaussian hypothesis test. FIG. 5(c) shows the single-scale variant of the proposed algorithm. FIG. 5(d) shows the proposed multi-scale algorithm.

FIG. 9 illustrates R-D coding performance comparison between the original (Ori.) H.264 encoder and the proposed (Pro.) video encoder.

DETAILED DESCRIPTION OF CERTAIN INVENTIVE EMBODIMENTS

Figure 2:
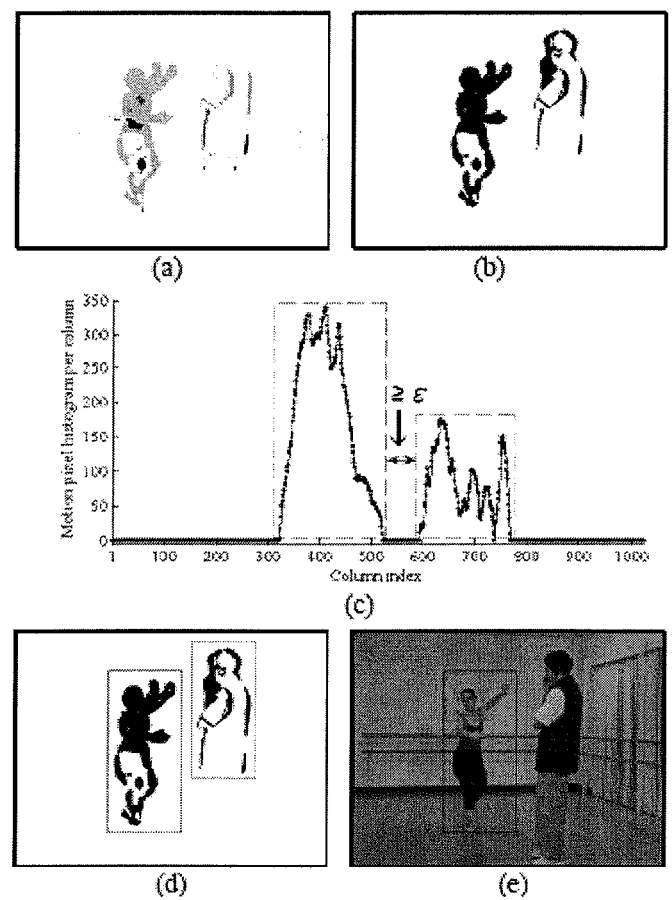
FIGS. 2(a)-(e) are diagrams illustrating the region level processing.

A multi-scale motion region detection technique is proposed that can quickly and reliably segment foreground motion regions from two successive video frames. The key idea is to leverage multi-scale structural aggregation to effectively accentuate real motion changes while suppressing trivial noisy changes. Consequently, this technique can be effectively applied to motion region-of-interest (ROI) based video coding.

Experiments show that the proposed algorithm can reliably extract motion regions and is less sensitive to thresholds than single-scale methods. Compared with a H.264/AVC encoder, the proposed semantic video encoder achieves a bit rate saving ratio of up to 34% at the similar video quality, besides an overall speedup factor of 2.6 to 3.6. The motion-ROI detection can process a 352×288 size video at 20 fps on an Intel Pentium 4 processor.

A Hierarchy Approach to Motion Region Detection Using Multi-Scale Aggregation

To reliably segment moving foreground objects from the input video frames, we use a bottom-up hierarchical approach that includes two different levels: 1) pixel level processing and 2) region level processing. At the pixel level, the proposed multi-scale structural change analysis is adequate to identify semantically important image changes, by filtering out the noise. Subsequently, we propose a series of fast and effective processing at the region level to group the detected motion pixels and further cull out spurious noisy regions.

Pixel Level: Multi-Scale Structural Change Detection

Instead of extracting feature contrast at a fixed scale, the proposed multi-scale feature space analysis is essentially meant to build up a reliable motion saliency map, by aggregating the support from different scales. Since image noise is inherently structure less whereas the real motion changes possess strong correlations across different scales, such a multi-scale aggregation actually functions as an adaptive filter, where signals are largely accentuated and the intensity of noise is effectively suppressed. The proposed multi-scale pixel level processing is depicted in FIG. 1, with the description as follows:

Step 1: Noise reduction. For the current luma frame It(x, y) at time t, we use a median filter to reduce the noise and denote the resulting image as $I'_t$. Note that whenever appropriate, we omit (x, y) from notations denoting two dimensional images, e.g., $I'_t$.

Note that step 1 is although recommendable, it remains optional.

Step 2: Construct Gaussian image pyramid Gt from $I'_t$ $$G_t = \{G_{l,t}: G_{l,t} = \downarrow(G_{l-1,t}) \text{ and } G_{0,t} = I'_t, l = 0, 1, \ldots N-1\}, \quad (1)$$

where $\downarrow(\cdot)$ is a Gaussian downsampling filter. Depending on the input frame resolution, N is typically set to 2 or 3 in our implementation to achieve a good trade-off between the quality and complexity.

Step 3: Apply the Laplacian operator to Gt and attain multiscale Laplacian maps of the input image, Lt. We adopt the second derivative of the pixel intensity to extract the underlying structure and eliminate the impact of the first order illumination changes.

For a 3×3 kernel, the Laplacian of a pixel is simply given by 8 times the central pixel's intensity minus the sum of its neighboring pixels.

$$L_t = \nabla^2 G_t = \partial^2 G_t/\partial x^2 + \partial^2 G_t/\partial y^2. \quad (2)$$

Step 4: Compute SAD (Sum of Absolute Difference) between Lt and Lt−1, and the resulting Dt captures the structural changes for two successive frames at different scales, as shown in FIG. 1(c-e).

$$D_t(x, y) = \sum_{u=x-1, v=y-1}^{u=x+1, v=y+1} |L_t(u, v) - L_{t-1}(u, v)|. \quad (3)$$

Step 5: Aggregate SAD of Laplacian maps (Dt) from each image scale (i.e., $D_{l,t}$, l=0 to N−1) into a single saliency map $S_t$:

$$S_t = \text{AGGREGATE}(D_t) = \sum_{l=0}^{N-1} \uparrow^l (D_{l,t}), \quad (4)$$

where $\downarrow 1$ (·) denotes performing the Gaussian upsampling operation 1-times. We normalize $S_t$ to get a gray-level image $S_t$, as in FIG. 1(f).

Step 6: Threshold the normalized gray-level image bSt using an empirical value r to generate a binary change mask, Bt (FIG. 1(g)):

$$B_t(x, y) = \begin{cases} 1 & \text{if } \hat{S}_t(x, y) > \tau \\ 0 & \text{otherwise.} \end{cases} \quad (5)$$

Step 7: Apply the median filter and morphological closing (dilation & erosion) operation to Bt, so as to rule out isolated noise and fill gaps and holes in the motion regions, as shown in FIG. 1(h). To avoid the computation redundancy in the video processing loop, we propose to store multi-scale Laplacian maps Lt-1 rather than the previous luma frame It-1. This change actually leads to an overall speedup factor of 1.2 to 1.3 on an Intel Pentium 4 processor.

Region Level: Connectivity Analysis and Noise Pruning

Although multi-scale structural change detection at the pixel level can segment the foreground motion regions very well, a clean map of correct motion blobs is hardly obtainable without enforcing the connectivity constraint (FIG. 2(b) vs. FIG. 1(h)). Therefore, we choose to employ a two-scan connected component labeling algorithm, which includes assigning a unique label to each maximal connected region of foreground pixels (FIG. 2(a)). Since the noise at this stage are typically stray groups with a size smaller than the smallest real motion regions, they can safely be culled by restricting the labeled motion area to cover a minimum number of pixels (FIG. 2(b)).

To speed up the execution, the connected component labeling algorithm adopts an array rather than the pointer based rooted trees to store the label equivalence information. Moreover, a path compression strategy is incorporated to accelerate the key Union-Find process [K. Wu, E. Otoo, and A. Shoshani, "Optimizing connected component labeling algorithm," in *Proc. SPIE Medical Imaging Conference*, 2005, vol. 5747, pp. 1965-1976., which is incorporated herein by reference], and it reduces the complexity by 40% for this specific part, compared with the implementation without using this scheme.

Usually, it is desirable that the detected motion blobs can be clustered into separate moving objects or bounding-boxes for high level semantic video processing. To meet this requirement with little complexity overhead, we propose a fast histogram analysis approach that does not need recursive neighborhood distance checking or region growing. More clearly, we assume that the moving objects distribute principally in the horizontal direction, and we collect the distribution histogram of motion pixels for each column of the detected motion map (with a 2D histogram for the general cases). Based on such a histogram, bounding-boxes are constructed to contain all the motion pixels, and they are split whenever a minimum horizontal gap Q is satisfied between two neighboring groups (see FIG. 2(c)). As an option, bounding-boxes that are too narrow along the horizontal direction can be culled out. Finally, to favor semantic video coding, we align the bounding-boxes to the macro block (MB) boundaries, and they are extended horizontally and vertically by 1 MB size to further guarantee the motion region detection results.

A Novel Application of the Proposed Technique in Motion-ROI Based Video Coding

Thanks to its fast and reliable nature, the proposed motion region detection technique has a good potential in several high-level video processing applications, e.g., object tracking, pose recognition and object-based video coding. In this paper, we focus on a novel semantic video coding scheme that greatly benefits from the motion-ROI concept, without altering the well-established MB coding pipeline.

The proposed video coding method mainly targets at encoding video contents captured by stationary cameras, which find wide applications in video surveillance, news broadcast, and video conference.

Typically, one of the unique characteristics associated with such stationary camera applications is that the moving foreground objects are of dominant interests, because they deliver critical semantic meaning compared with the static background scenes.

Figure 3:
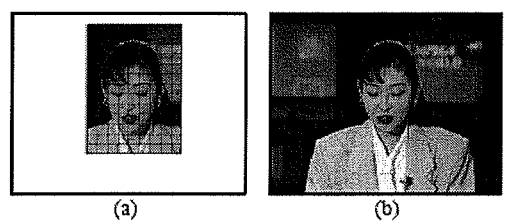
FIGS. 3(a)-(b) are diagrams showing a Motion-ROI based video coding.

The key idea of our proposed video coding technique is to encode and transmit only the motion foreground regions defined by the metadata of bounding-boxes (e.g., FIG. 2(e)), while repeating the background regions from the previous reconstructed frame. FIG. 3 illustrates the basic principle. In fact, this joint motion-ROI tracking and background replication scheme brings two clear advantages for efficient video coding: 1) the compressed bitrate can be largely reduced at the similar video quality, because only a limited number of MBs are encoded for each frame; 2) our experiments further show that the overall execution speed of motion-ROI based video coding (including the detection overhead) is about three times faster than that of conventional frame-based video encoders, though motion region detection is needed as pre-processing step. This indicates that the proposed multi-scale algorithm is very computationally efficient.

Experimental Results and Discussion

In experiments, the proposed multi-scale motion region detection algorithm is implemented in C++ and OpenCV APIs. We use two scales to detect motion regions for CIF size video sequences, i.e., Hall and Akiyo, and three scales for Ballet at 1024×768. The proposed semantic video codec is implemented on H.264 JM software, version 10.1. Baseline profile is used to configure the encoder. We set the number of reference frames to 1, and all frames except for the first one are encoded as P-frames. R-D optimization and CAVLC entropy encoding are enabled. Fast full search is adopted for motion estimation, and the search range is set to about 16. Note that we have not conducted any special code-level optimization to either multi-scale motion detection or H.264 JM software. All the experiments are performed on a 3.2 GHz Intel Pentium 4 processor with 1 GB RAM.

Motion Region Detection Results

Figure 4:
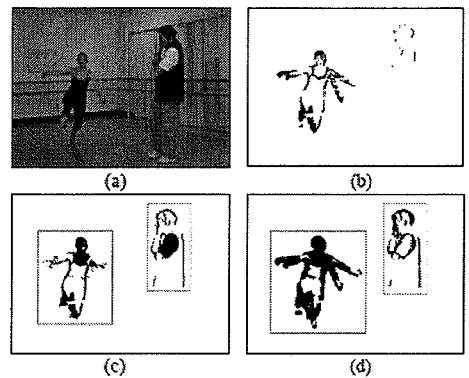
FIGS. 4(a)-(d) are diagrams showing motion detection results for Ballet (at frame 6).
Figure 5:
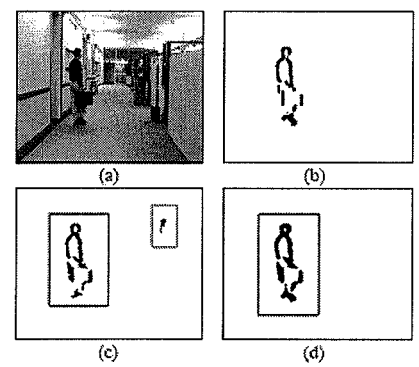
FIGS. 5(a)-(d) are diagrams showing motion detection results for Hall (at frame 37).

FIGS. 4 and 5 clearly show that the proposed hybrid multi-scale approach can more reliably detect the motion blobs over Gaussian hypothesis test, as well as the single-scale variant of the proposed method. Therefore, proper bounding-boxes defining motion regions can be attained by our algorithm for various sequences with different visual features. Ballet is a multi-view video sequence from Microsoft Research, where some parts of the foreground dancer have low intensity contrasts against the background. Hall represents a video clip captured under unstable (or flickering) lighting conditions. Because motion regions can be reliably tracked by our multiscale technique, we find that the extension of boundingboxes can be safely reduced to 1 MB size (even to 0), compared to a conservative value of 3 in our single-scale implementation. Such an algorithm upgrade can reduce the average bounding-box area, resulting in about 29% less MBs to be coded by the proposed video codec for Ballet. Furthermore, owing to this multi-scale processing, real feature changes can be accentuated while the noise is largely suppressed. Hence, the proposed algorithm is less sensitive to the threshold setting than the traditional single-scale image change detection techniques. For instance, for Hall (at frame 37) in FIG. 5, the valid threshold ranges (normalized to [0,11]) using Gaussian hypothesis test, the single-scale variant of the proposed algorithm, and the proposed multi-scale algorithm are 7%, 4%, and 14%, respectively.

The Performance of the Motion-ROI Based Video Encoder

Figure 6:
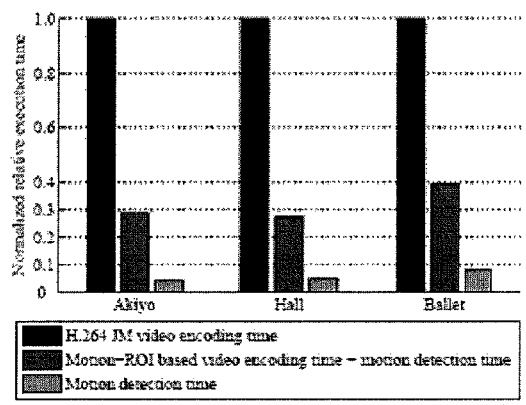
FIG. 6 is a diagram showing relative execution time comparison of different schemes and their processing speeds. Based on this technique, the performance of the proposed motion-ROI based video encoders is greatly boosted.

Because we use the background replication for the static regions while only coding the foreground motion regions, the conventional frame-based PSNR becomes inappropriate in assessing the video quality. Moreover, the frame-based PSNR tends to be highly influenced by the original video's background noise variations (discarded in our encoder for they are classified as trivial noisy changes in the preprocessing steps), which would hence yield unfair PSNR figures. In order to properly emulate the perceptual quality in such situations, an objective quality metric is proposed [A. Cavallaro, O. Steiger, and T. Ebrahimi, "Semantic video analysis for adaptive content delivery and automatic description," *IEEE Tran. on CSVT*, vol. 15, pp. 1200-1209, October 2005.], whose basic idea is to unevenly weight the errors in different image areas according to semantic partitions, e.g., background replication has a small impact on the overall image quality, compared to foreground regions. This method therefore favors constant foreground (FG) PSNRs, which has the highest impact on the visual quality. FIG. 9 presents the R-D performance comparison between the original H.264 encoder and the proposed semantic video encoder. At the negligible FGPSNR changes and similar frame-level subjective quality, the proposed motion-ROI based video coding leads to a bitrate saving ratio of up to 34.1%, compared with the original H.264 video encoder. From the complexity aspect, we observe from FIG. 6 that the proposed semantic video encoder (including motion detection overhead) runs 2.6 to 3.6 times faster than the original H.264 encoder. We can still achieve a speedup factor of 2.3 to 3.2, when the simplified UMHexagonS is used for fast motion estimation in both encoders. The reasons for such a significant speedup are two-fold: firstly, because a lower number of foreground MBs are encoded while the background MBs are skipped, the proposed coding process is largely accelerated. Secondly, since the proposed multi-scale algorithm is designed for a good balance between the quality and the speed, the complexity overhead due to this additional preprocessing is very limited. In fact, the speed test of our proposed multi-scale method indicates that a real-time framerate of 20 fps is reached for an image size of 352×288 on our 3.2 GHz Intel Pentium 4 platform.

Extending the Application to Pose Recognition

Not limited to its application in semantic video coding, the proposed motion region detection technique can also be applied to pose recognition by generating timed Motion History Image (tMHI) [G. Bradski and J. Davies, "Motion segmentation and pose recognition with motion history gradients," in *IEEE WACV*, 2000, pp. 238-244., which is incorporated herein by reference]. Rather than demanding an appropriate background model to extract silhouette maps, our algorithm can identify motion blobs from two successive frames, which suffice for constructing tMHI. Our experiments (not reported here due to the limited space) show that the movement of the dancer's arms in Ballet can be encoded in a single gray-level tMHI image, facilitating the high-level pose recognition.

In one embodiment, a fast and reliable motion region detection algorithm is proposed to segment moving foreground objects from the input videos. One of the key contributions is our multi-scale structural change aggregation scheme, in addition to an integrated hierarchical motion detection and noise pruning approach, which yields a good trade-off between the quality.

Figure 7:
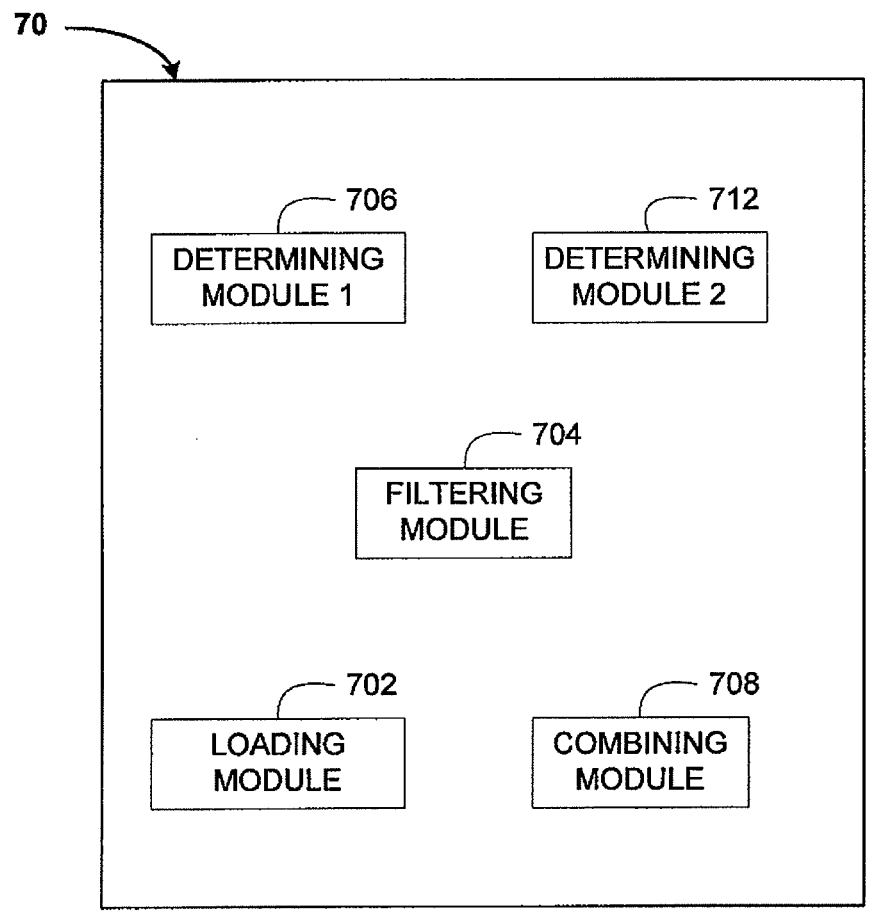
FIG. 7 shows a block diagram illustrating one embodiment of a device for defining a region of motion within a video frame in a sequence of video frames.

FIG. 7 shows a block diagram illustrating one embodiment of a device for defining a region of motion within a video frame in a sequence of video frames. The device 70 may comprise a loading module 702 configured to load a current video frame and at least one reference video frame from the sequence, the reference video frame being different from the current video frame. The device 70 may further comprise a filtering module 704 configured to apply filtering operations on the current and the reference video frame in order to obtain at least two scales of representation of the current and the reference video frame. The device 70 may further comprise a first determining module 706 configured to determine for each of the scale representations a video-frame like representation of the structural changes between the current and the reference video frame. The device 70 may further comprise a combining module 708 configured to combine the video-frame like representations of different scales. The device 70 may further comprise a second determining module 712 configured to determine one or more regions of motion from the combination.

Figure 8:
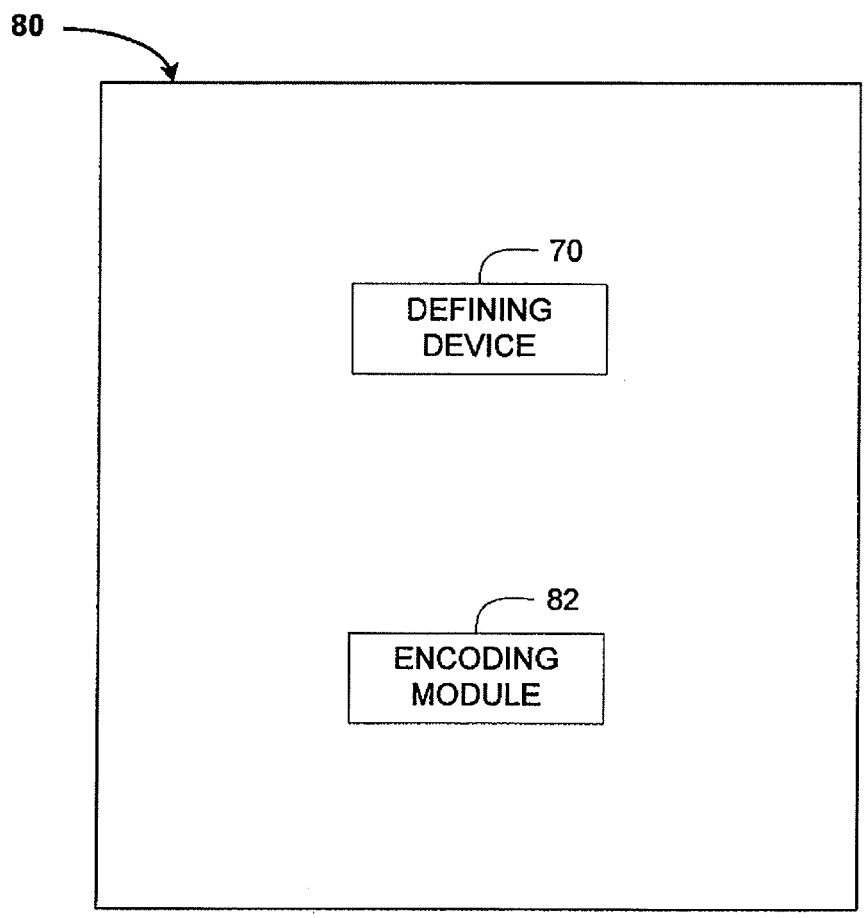
FIG. 8 shows a block diagram illustrating one embodiment of a device for coding a sequence of video frames.

FIG. 8 shows a block diagram illustrating one embodiment of a device for coding a sequence of video frames. The device 80 may comprise a defining device configured to define a region of motion within a video frame in a sequence of video frames such as the device 70 as described with regard to FIG. 7 in above. The device 80 may further comprise an encoding module 82 configured to perform motion estimation/compensation based encoding, wherein the motion estimation/motion compensation is used only on the regions of motion determined by the defining device 70.

Although systems and methods as disclosed, are embodied in the form of various discrete functional blocks, the system could equally well be embodied in an arrangement in which the functions of any one or more of those blocks or indeed, all of the functions thereof, are realized, for example, by one or more appropriately programmed processors or devices.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of detecting a region of motion in a sequence of video frames, the method comprising:
   receiving a first video frame and a reference video frame from a sequence of video frames, the reference video frame being different from the first video frame;
   processing the first video frame and the reference video frame to obtain each of the first video frame and the reference video frame at a plurality of different scales;
   determining, for each of the scales, a representation of at least one structural change between the first video frame and the reference video frame at the scale; and
   determining one or more regions of motion based at least in part on the representations, the regions of motion being moving foreground objects.

2. The method of claim 1, wherein at least one of the first and reference video frames is pre-filtered to reduce noise.

3. The method of claim 1, wherein at least one of the scales is obtained by applying down-sampling operations.

4. The method of claim 1, wherein at least one of the scales is filtered to suppress first order illumination changes.

5. The method of claim 1, determining the representation comprises performing a subtraction operation between the first and the reference video frame at the scale.

6. The method of claim 1, wherein determining one or more regions of motion comprises performing a summing operation of the representations.

7. A video processing system adapted for carrying out the method of claim 1.

8. A non-transitory computer-readable medium having stored therein a computer program that, when executed, is configured to perform the method of claim 1.

9. The method of claim 1, wherein processing the first video frame and the reference video frame comprises filtering the first video frame and the reference video frame to obtain each of the first video frame and the reference video frame at a plurality of different scales.

10. The method of claim 1, further comprising extracting, for each of the scales, underlying structure of the processed first video frame and the reference video frame at the scale.

11. The method of claim 10, wherein the process of extracting underlying structure comprises, for each of the scales, applying a Laplacian operator to attain a Laplacian map of the first video frame and the reference video frame at the scale.

12. A method of coding a sequence of video frames, comprising:
   performing a method of detecting a region of motion in a sequence of video frames, the method comprising:
      receiving a first video frame and a reference video frame from the sequence, the reference video frame being different from the first video frame,
      processing the first video frame and the reference video frame to obtain each of the first video frame and the reference video frame at a plurality of different scales,
      determining, for each of the scales, a representation of at least one structural change between the first video frame and the reference video frame at the scale,
      determining one or more regions of motion based at least in part on the representations, the regions of motion being moving foreground objects; and
   performing motion estimation/compensation based encoding, wherein the motion estimation/motion compensation is performed only on the determined regions of motion.

13. A video encoder adapted for carrying out the method of claim 12.

14. A non-transitory computer-readable medium having stored therein a computer program that, when executed, is configured to perform the method of claim 12.

15. A device for detecting a region of motion in a sequence of video frames, the device comprising:
   a loading module configured to receive a first video frame and a reference video frame from a sequence of video frames, the reference video frame being different from the first video frame;
   a processing module configured to process the first video frame and the reference video frame to obtain each of the first video frame and the reference video frame at a plurality of different scales;
   a first determining module configured to determine, for each of the scales, a representation of at least one structural change between the first video frame and the reference video frame at the scale; and
   a second determining module configured to determine one or more regions of motion based at least in part on the representations, the regions of motion being moving foreground objects.

16. The device of claim 15, further comprising a pre-filtering module to pre-filter at least one of the first video frame and reference video frames to reduce noise.

17. The device of claim 15, wherein the process module is configured to apply down-sampling operations to obtain at least one of the scales.

18. The device of claim 15, further comprising a filtering module to filter at least one of the scales so as to suppress first order illumination changes.

19. The device of claim 15, wherein the first determining module is configured to determine the representation by performing a subtraction operation between the first video frame and the reference video frame at the scale.

20. The device of claim 15, wherein the second determining module is configured to determine one or more regions of motion by performing a summing operation of the representations.

21. The device of claim 15, wherein the processing module is additionally configured to filter the first video frame and the reference video frame to obtain each of the first video frame and the reference video frame at a plurality of different scales.

22. A device for detecting a region of motion in a sequence of video frames, the device comprising:
   means for receiving a first video frame and a reference video frame from a sequence of video frames, the reference video frame being different from the first video frame;
   means for processing the first video frame and the reference video frame to obtain each of the first video frame and the reference video frame at a plurality of different scales;
   means for determining, for each of the scales, a representation of at least one structural change between the first video frame and the reference video frame at the scale; and
   means for determining one or more regions of motion based at least in part on the representations, the regions of motion being moving foreground objects.

* * * * *

UNITED STATES PATENT AND TRADEMARK OFFICE
CERTIFICATE OF CORRECTION

PATENT NO.        : 8,532,339 B2  
APPLICATION NO.   : 13/205546  
DATED             : September 10, 2013  
INVENTOR(S)       : Lu Page 1 of 1

It is certified that error appears in the above-identified patent and that said Letters Patent is hereby corrected as shown below:

In the Specification

Column 4 at line 49 (approx.), change "$l = 0, 1, \ldots N - 1$" to --$l = 0, 1, \ldots, N - 1$--.

Column 5 at line 20, change "r" to --$\tau$--.

Column 7 at line 20, change "[0,11]" to --[0,1]--.

Signed and Sealed this  
Third Day of June, 2014

Michelle K. Lee  
*Deputy Director of the United States Patent and Trademark Office*